United States Patent
Kim (10) Patent No.: US 10,344,681 B2
(45) Date of Patent: Jul. 9, 2019

(54) METHOD AND APPARATUS FOR DIAGNOSING ENGINE SYSTEM

(71) Applicants: HYUNDAI MOTOR COMPANY, Seoul (KR); KIA MOTORS CORPORATION, Seoul (KR)

(72) Inventor: Seungbum Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 72 days.

(21) Appl. No.: 15/832,015

(22) Filed: Dec. 5, 2017

(65) Prior Publication Data

US 2018/0163643 A1 Jun. 14, 2018

(30) Foreign Application Priority Data

Dec. 9, 2016 (KR) .................. 10-2016-0167759

(51) Int. Cl.
| | |
|---|---|
| F02D 13/02 | (2006.01) |
| F02M 26/49 | (2016.01) |
| F02D 41/00 | (2006.01) |
| F02D 41/12 | (2006.01) |

(Continued)

(52) U.S. Cl.
CPC ..... F02D 13/0215 (2013.01); F02D 41/0047 (2013.01); F02D 41/0055 (2013.01); F02D 41/123 (2013.01); F02D 41/22 (2013.01); F02M 26/49 (2016.02); F02D 2041/001 (2013.01); F02D 2200/0406 (2013.01); F02D 2200/501 (2013.01); F02D 2200/602 (2013.01); F02M 2026/001 (2016.02); Y02T 10/18 (2013.01)

(58) Field of Classification Search
CPC ...... F02D 13/02; F02D 13/0215; F02D 41/00; F02D 41/0022; F02D 41/0047; F02D 41/0055; F02D 41/123; F02D 41/22; F02M 26/49
USPC .... 123/478, 198 F, 198 DB, 568.16, 568.25, 123/568.19; 73/114.38, 114.53, 114.54; 701/107, 108, 112, 114
See application file for complete search history.

(56) References Cited

U.S. PATENT DOCUMENTS 7,146,851 B2 * 12/2006 Wakahara ................ F01L 1/34
73/114.72
2018/0163658 A1 * 6/2018 Kim ........................ F01L 1/356

FOREIGN PATENT DOCUMENTS

| JP | 2000-110594 A | 4/2000 |
|---|---|---|
| JP | 2001-159375 A | 6/2001 |
| JP | 2007-192113 A | 8/2007 |

(Continued)

*Primary Examiner* — John Kwon
*Assistant Examiner* — Johnny H Hoang
(74) *Attorney, Agent, or Firm* — Brinks Gilson & Lione (57) ABSTRACT

A method of and an apparatus for diagnosing an engine system are provided. An apparatus for diagnosing an engine system including a continuous variable valve duration (CVVD) apparatus and an exhaust gas recirculation (EGR) apparatus may include: an accelerator pedal position sensor detecting a position of an accelerator pedal; a brake pedal position sensor detecting a position of a brake pedal; a vehicle speed sensor detecting a speed of a vehicle; an intake pressure sensor detecting an intake pressure; and a controller determining whether a fuel cut condition is satisfied and determining whether the CVVD apparatus and an EGR valve is in a failure state when the fuel cut condition is satisfied.

20 Claims, 4 Drawing Sheets

(51) Int. Cl.
*F02D 41/22* (2006.01)
*F02M 26/00* (2016.01)

(56) References Cited

FOREIGN PATENT DOCUMENTS

| | | |
|---|---|---|
| JP | 2016-194250 A | 11/2016 |
| KR | 10-1014476 B1 | 2/2011 |

* cited by examiner

METHOD AND APPARATUS FOR DIAGNOSING ENGINE SYSTEM

CROSS-REFERENCE TO RELATED APPLICATION

This application claims priority to and the benefit of Korean Patent Application No. 10-2016-0167759 filed on Dec. 9, 2016, which is incorporated herein by reference in its entirety.

FIELD

The present disclosure relates to a method of and an apparatus for diagnosing an engine system.

BACKGROUND

The statements in this section merely provide background information related to the present disclosure and may not constitute prior art.

An internal combustion engine generates power by burning fuel in a combustion chamber in an air media drawn into the chamber. Intake valves are operated by a camshaft in order to intake the air, and the air is drawn into the combustion chamber while the intake valves are open. In addition, exhaust valves are operated by the camshaft, and a combustion gas is exhausted from the combustion chamber while the exhaust valves are open.

Desired operation of the intake valves and the exhaust valves depends on a rotation speed of the engine. That is, a desired lift or desired opening/closing timing of the valves may be determined based on the rotation speed of the engine. In order to achieve the desired valve operation depending on the rotation speed of the engine, various researches, such as designing of a plurality of cams and a continuous variable valve lift (CVVL) that can change valve lift according to engine speed, have been conducted.

In addition, in order to achieve such a desired valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

However, the general CVVL and CVVT are complicated in construction and are expensive in manufacturing cost.

Therefore, a continuous variable valve duration (CVVD) apparatus that can adjust an opening duration of a valve according to an operation state of the engine has been researched.

An exhaust gas recirculation (EGR) apparatus resupplies a portion of exhaust gas exhausted from the combustion chamber to the chamber.

In order to apply the CVVD apparatus and the EGR apparatus to the engine system, a method of diagnosing whether the CVVD apparatus and the EGR apparatus are normally operating is desired.

The above information disclosed in this Background section is only for enhancement of understanding of the background of the present disclosure and therefore it may contain information that does not form the prior art that is already known to a person of ordinary skill in the art.

SUMMARY

The present disclosure provides a method of and an apparatus for diagnosing an engine system having advantages of being capable of diagnosing an engine system including a continuous variable valve duration apparatus and a low pressure exhaust gas recirculation apparatus.

In one form of the present disclosure, a method of diagnosing an engine system including a continuous variable valve duration (CVVD) apparatus and a low pressure exhaust gas recirculation (LP-EGR) apparatus may include: detecting data, by a data detector, for diagnosing the engine system; determining, by a controller, whether a fuel cut condition is satisfied based on the detected data; operating, by the controller, an EGR valve such that an opening amount of the EGR valve becomes a first target opening amount when the fuel cut condition is satisfied; determining, by the controller, whether an increased amount of an intake pressure by operation of the EGR valve is within a first predetermined range; operating, by the controller, the CVVD apparatus such that an opening duration of an intake valve becomes a first target duration when the increased amount of the intake pressure by operation of the EGR valve is within the first predetermined range; determining, by the controller, whether a decreased amount of the intake pressure by operation of the CVVD apparatus is within a second predetermined range; and determining, by the controller, that the CVVD apparatus is in a failure state when the decreased amount of the intake pressure by operation of the CVVD apparatus is out of the second predetermined range.

The method may further include determining, by the controller, that the EGR valve is in a failure state when the increase amount of the intake pressure by operation of the EGR valve is out of the first predetermined range.

The method may further include: maintaining, by the controller, the opening amount of the EGR valve at the first target opening amount and the opening duration of the intake valve at the first target duration for a predetermined time when the decreased amount of the intake pressure by operation of the CVVD apparatus is within the second predetermined range; monitoring, by the controller, the intake pressure at a time point at which the predetermined time has elapsed; and determining, by the controller, whether the intake pressure at the time point at which the predetermined time has elapsed is within a third predetermined range.

The method may further include: determining, by the controller, that the CVVD apparatus is in the failure state when the intake pressure at the time point at which the predetermined time has elapsed is out of the third predetermined range.

The method may further include: operating, by the controller, the EGR valve such that the opening amount of the EGR valve becomes a second target opening amount when the intake pressure at the time point at which the predetermined time elapsed is within the third predetermined range, wherein the second target opening amount is less than the first target opening amount.

The method may further include: determining, by the controller, whether the decreased amount of the intake pressure by operation of the EGR valve is within a fourth predetermined range; and determining, by the controller, that the EGR valve is in a failure state when the decreased amount of the intake pressure by operation of the EGR valve is out of the fourth predetermined range.

The method may further include: operating, by the controller, the CVVD apparatus such that the opening duration of the intake valve becomes a second target duration when the decreased amount of the intake pressure by operation of the EGR valve is within the fourth predetermined range, wherein the second target duration is less than the first target duration.

The method may further include: determining, by the controller, whether the increased amount of the intake pressure by operation of the CVVD apparatus is within a fifth predetermined range; and determining, by the controller, that the CVVD apparatus is in the failure state when the increased amount of the intake pressure by operation of the CVVD apparatus is out of the fifth predetermined range.

The method may further include determining, by the controller, that the CVVD apparatus and the EGR valve are in a normal state when the increased amount of the intake pressure by operation of the CVVD apparatus is within the fifth predetermined range.

An apparatus for diagnosing an engine system including a continuous variable valve duration (CVVD) apparatus and an exhaust gas recirculation (EGR) apparatus according to an exemplary form of the present disclosure may include: an accelerator pedal position sensor configured to detect a position of an accelerator pedal; a brake pedal position sensor configured to detect a position of a brake pedal; a vehicle speed sensor configured to detect a speed of a vehicle; an intake pressure sensor configured to detect an intake pressure; and a controller configured to control an EGR valve and the CVVD apparatus and determine whether a fuel cut condition is satisfied and whether the CVVD apparatus and the EGR valve is in a failure state when the fuel cut condition is satisfied.

In particular, when the fuel cut condition is satisfied, an opening amount of the EGR valve is controlled to be a first target opening amount, and when an increased amount of the intake pressure by operation of the EGR valve is within a first predetermined range, an opening duration of an intake valve is controlled by the CVVD apparatus to be a first target duration. The controller further determines that the CVVD apparatus is in the failure state when a decreased amount of the intake pressure by operation of the CVVD apparatus is beyond a second predetermined range.

The controller may determine that the EGR valve is in the failure state when the increase amount of the intake pressure by operation of the EGR valve is beyond the first predetermined range.

The controller may maintain the opening amount of the EGR valve at the first target opening amount and the opening duration of the intake valve at the first target duration for a predetermined time when the decrease amount of the intake pressure by operation of the CVVD apparatus is within the second predetermined range. The controller also monitors the intake pressure at a time point at which the predetermined time has elapsed, and determines whether the intake pressure at the time point at which the predetermined time has elapsed is within a third predetermined range.

The controller may determine that the CVVD apparatus is in the failure state when the intake pressure at the time point at which the predetermined time is not within the third predetermined range.

When the intake pressure at the time point at which the predetermined time has elapsed is within the third predetermined range, the opening amount of the EGR valve is controlled by the EGR valve to be a second target opening amount. Here, the second target opening amount may be less than the first target opening amount.

The controller may determine whether a decreased amount of the intake pressure by operation of the EGR valve is within a fourth predetermined range and determine that the EGR valve is in the failure state when the decreased amount of the intake pressure by operation of the EGR valve is not within the fourth predetermined range.

The controller may operate the CVVD apparatus such that the opening duration of the intake valve becomes a second target duration when the decreased amount of the intake pressure by operation of the EGR valve is within the fourth predetermined range. Here, the second target duration may be less than the first target duration.

The controller may determine whether an increased amount of the intake pressure by operation of the CVVD apparatus is within a fifth predetermined range and determine that the CVVD apparatus is in the failure state when the increased amount of the intake pressure by operation of the CVVD apparatus is not within the fifth predetermined range.

The controller may determine that the CVVD apparatus and the EGR valve are in a normal state when the increase amount of the intake pressure by operation of the CVVD apparatus is within the fifth predetermined range.

A method of diagnosing an engine system including a continuous variable valve duration (CVVD) apparatus and an exhaust gas recirculation (EGR) apparatus according to another exemplary form of the present disclosure may include: detecting, by a data detector, data for diagnosing the engine system; determining, by a controller, whether a fuel cut condition is satisfied based on the detected data; operating, by the controller, an EGR valve such that an opening amount of the EGR valve becomes a first target opening amount when the fuel cut condition is satisfied; determining, by the controller, whether an increased amount of an intake pressure by operation of the EGR valve is within a first predetermined range; operating, by the controller, the CVVD apparatus such that an opening duration of an exhaust valve becomes a first target duration when the increased amount of the intake pressure by operation of the EGR valve is within the first predetermined range; determining, by the controller, whether a decreased amount of the intake pressure by operation of the CVVD apparatus is within a second predetermined range; and determining, by the controller, that the CVVD apparatus is in a failure state when the decreased amount of the intake pressure by operation of the CVVD apparatus is out of the second predetermined range.

An apparatus for diagnosing an engine system including a continuous variable valve duration (CVVD) apparatus and a low pressure exhaust gas recirculation (EGR) apparatus according to another exemplary form of the present disclosure may include: an accelerator pedal position sensor configured to detect a position of an accelerator pedal; a brake pedal position sensor configured to detect a position of a brake pedal; a vehicle speed sensor configured to detect a speed of a vehicle; an intake pressure sensor configured to detect an intake pressure; and a controller configured to determine whether a fuel cut condition is satisfied based on signals from at least one of the accelerator position sensor, brake pedal position sensor, vehicle speed sensor or intake pressure sensor, and configured to determine whether the CVVD apparatus and an EGR valve is in a failure state when the fuel cut condition is satisfied.

In particular, the controller controls, via the EGR valve, an opening amount of the EGR valve to be a first target opening amount when the fuel cut condition is satisfied, and also controls, via the CVVD apparatus, an opening duration of an exhaust valve to be a first target duration when an increased amount of the intake pressure by operation of the EGR valve is within a first predetermined range. The controller further determines that the CVVD apparatus is in the failure state when a decreased amount of the intake pressure by operation of the CVVD apparatus is not within a second predetermined range.

According to an exemplary form of the present disclosure, failures of the CVVD apparatus and the EGR apparatus may be diagnosed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Hereinafter, the present disclosure will be described more fully with reference to the accompanying drawings, in which exemplary forms of the present disclosure are shown. However, the present disclosure is not limited to the exemplary forms described herein, and may be modified in various different ways.

The drawings and description are to be regarded as illustrative in nature and not restrictive. Like reference numerals designate like elements throughout the specification. The configurations illustrated in the drawings are arbitrarily shown for better understanding and ease of description, but the present disclosure is not limited thereto.

Figure 1:
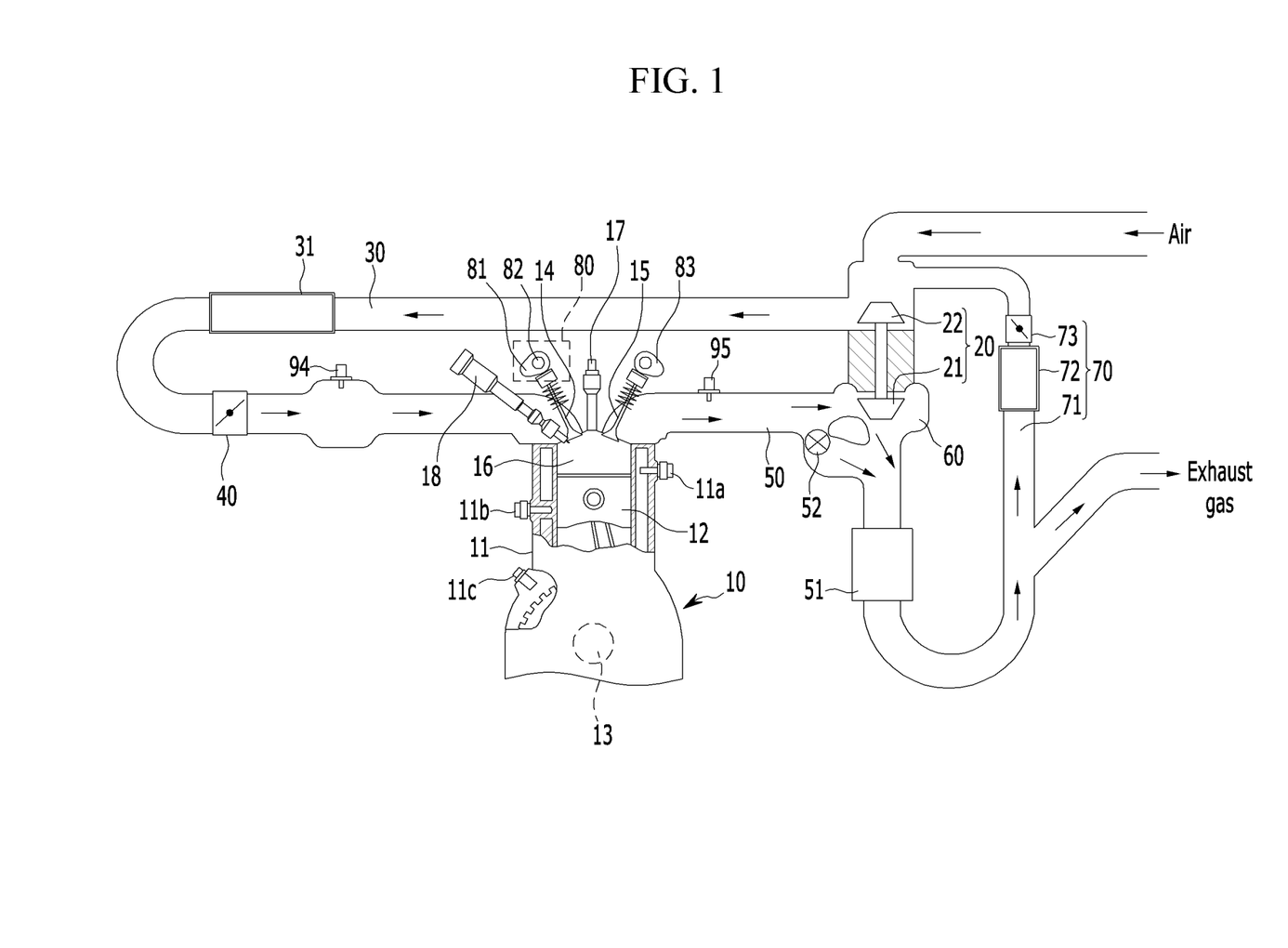
FIG. 1 is a schematic diagram of an engine system in one exemplary form of the present disclosure.
Figure 2:
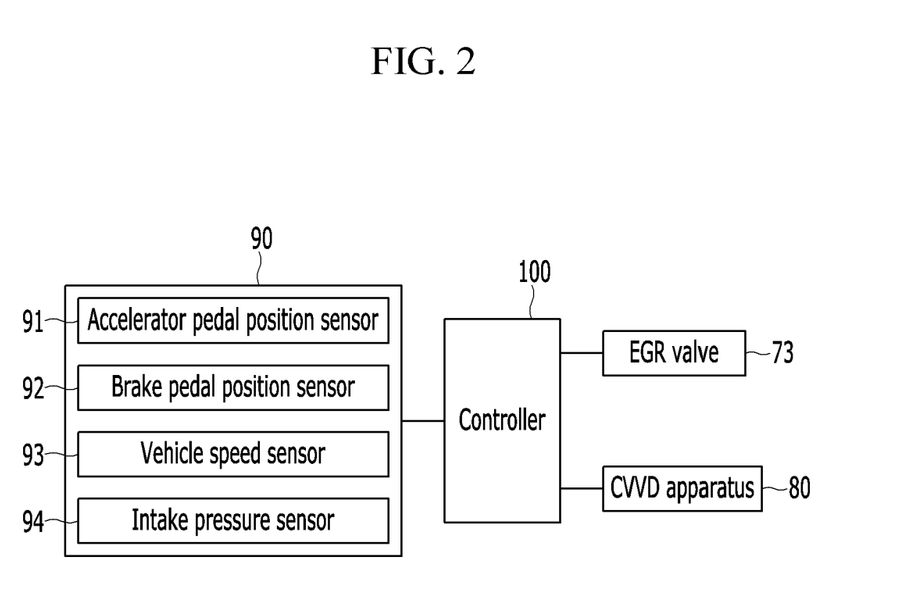
FIG. 2 is a block diagram of an apparatus for diagnosing an engine system in one exemplary form of the present disclosure.

FIG. 1 is a schematic diagram of an engine system according to an exemplary form of the present disclosure, and FIG. 2 is a block diagram of an apparatus for diagnosing an engine system according to an exemplary form of the present disclosure.

Referring to FIGS. 1 and 2 an engine system may include an engine 10, a turbocharger 20, an intake line 30, a throttle valve 40, a first exhaust line 50, a second exhaust line 60, a low pressure exhaust gas recirculation (LP-EGR) apparatus 70, and a continuous variable valve duration (CVVD) apparatus 80.

The engine 10 burns fuel and air to convert chemical energy into mechanical energy. The engine 10 includes a cylinder 11, a piston 12, a crankshaft 13, an intake valve 14, and an exhaust valve 15.

The piston 12 and the crankshaft 13 are mounted in the cylinder 11. The piston 12 reciprocates by explosion force of the fuel and rotates the crankshaft 13. A combustion chamber 16 is formed between the cylinder 11 and the piston 12.

The engine 10 is connected with the intake line 30 to receive air, and exhaust gas generated in a combustion process is exhausted to the outside of the engine 10 through the first exhaust line 50. The intake line 30 is opened or closed by the intake valve 14, and the first exhaust line 50 is opened or closed by the exhaust valve 15. The intake valve 14 may be operated by an intake cam 81 of the CVVD apparatus 80, and the exhaust valve 15 may be operated by an exhaust cam 83.

An injector 17 injects fuel into the combustion chamber 16, and a spark plug 18 ignites mixed gas in which the fuel and the air are mixed.

A coolant temperature sensor 11a, a knock sensor 11b, and a crankshaft position sensor 11c are mounted to the cylinder 11. The coolant temperature sensor 11a detects a temperature of coolant and transmits a signal corresponding thereto to a controller 100. The knock sensor 11b detects a vibration and transmits a signal corresponding thereto to the controller 100, and the controller 100 determines whether knocking occurs based on the signal of the knock sensor 11b. The crankshaft position sensor 11c detects a rotation angle of the crankshaft 13 and transmits a signal corresponding thereto to the controller 100, and the controller 100 calculates a speed of the engine 10 based on the crankshaft position sensor 11c.

The turbocharger 20 includes a turbine 21 and a compressor 22. The turbine 21 may rotate by the exhaust gas, and the compressor 22 may rotate by power occurring by a rotation of the turbine 21.

The intake line 30 supplies air to the engine 10. While the compressor 22 rotates, air entered from the outside is compressed to be supplied to the engine 10. Therefore, the compressed air is supplied to enhance an output of the engine 10. In order to cool air that passes through the compressor 22, an intercooler 31 may be mounted on the intake line 30.

The throttle valve 40 is mounted on the intake line 30, and flow of air supplied from the intake line 30 to the engine 10 is controlled according to an opening amount of the throttle valve 40.

An intake pressure sensor 94 is mounted on the intake line 30 between the throttle valve 40 and the engine 10 and detects an intake pressure to transmit a signal corresponding thereto to the controller 100.

The first exhaust line 50 exhausts the exhaust gas exhausted from the engine 10 to the outside of a vehicle. A catalyst 51 may be mounted on the first exhaust line 50 to reduce a harmful component of the exhaust gas.

The second exhaust line 60 is formed such that a portion of the exhaust gas joins to the first exhaust line 50 via the turbine 21. An amount of the exhaust gas that passes through the turbine 21 is controlled according to an opening amount of a waste gate valve 52 mounted on the first exhaust line 50.

An exhaust pressure sensor 95 is mounted on the first exhaust line 50 and detects an exhaust pressure to transmit a signal corresponding thereto to the controller 100.

The low pressure EGR apparatus 70 may include an EGR line 71, an EGR cooler 72, and an EGR valve 73.

The EGR line 71 may connect downstream of the catalyst 51 and the intake line 30. A portion of the exhaust gas exhausted from the catalyst 51 may be resupplied to the engine 10 via the EGR line 71.

The EGR cooler 72 is mounted on the EGR line 71 to cool the exhaust gas supplied to the intake line 30.

The EGR valve 73 is mounted on the EGR line 71. When the EGR valve 73 is opened, a portion of the exhaust gas exhausted from the catalyst 51 may resupplied to the engine 10 via the EGR line 71. When the EGR valve 73 is closed, the exhaust gas exhausted from the catalyst 51 is not resupplied to the engine 10 via the EGR line 71. An exhaust gas supplied to the intake line 30 via the EGR line 71 according to an opening amount the EGR valve 73 is referred to as an external EGR gas.

The CVVD apparatus 80 adjusts an opening duration of the intake valve 14. The opening duration is a time that elapses while the intake valve 14 is open. The CVVD apparatus 80 includes the intake cam 81 and a camshaft 82. The CVVD apparatus 80 may change a relative rotation speed of the intake cam 81 with respect to the camshaft 82. In other words, the opening duration of the intake valve 14 increases or decreases according to operation of the CVVD apparatus 80. Since the details of the CVVD apparatus may be referred to Korean Patent Application No. 10-2015-0178650, duplicate detailed description thereof will be omitted here, but is incorporated by reference in its entirety. The CVVD apparatus described in Korean Patent Application 10-2015-0178650 is an example of a CVVD apparatus, and the present disclosure may be applied to various other CVVD apparatuses known in the art.

In the art, a term "valve overlap is known as a section in which an intake valve and an exhaust valve 15 are simultaneously opened (e.g, simultaneous opening period of the intake and exhaust valves). Here, the valve overlap occurs according to operation of the CVVD 80, and thus a portion of the exhaust gas exhausted from the combustion chamber 16 may be resupplied to the combustion chamber 16. An exhaust gas supplied to the combustion chamber 16 according to operation of the CVVD apparatus 80 is referred to as an internal EGR gas. A temperature of the combustion chamber 16 may be lowered using the internal EGR gas. In an exemplary form of the present disclosure, it is illustrated that the CVVD apparatus 80 adjusts the opening duration of the intake valve 14, but the present disclosure may be applied to a case in which the CVVD apparatus 80 adjusts an opening duration of the exhaust valve 15.

In one form, referring to FIG. 2, an apparatus for diagnosing an engine system may include a data detector 90, the controller 100, the EGR valve 73, and the CVVD apparatus 80.

The data detector 90 detects data for diagnosing the engine system, and the data detected by the data detector 90 is transmitted to the controller 100. The data detector 90 may include an accelerator pedal position sensor 91, a brake pedal position sensor 92, a vehicle speed sensor 93, and an intake pressure sensor 94. The data detector 90 may further include sensors (e.g., an oxygen sensor and so on) for controlling the engine system.

The accelerator pedal position sensor 91 detects a position of an accelerator pedal (i.e., a pushed degree of the accelerator pedal) and transmits a signal corresponding thereto to the controller 100. When the accelerator pedal is pushed completely, the position of the accelerator pedal is 100%, and when the accelerator pedal is not pushed (e.g., entirely released), the position of the accelerator pedal is 0%.

The brake pedal position sensor 92 detects a position of a brake pedal (i.e., a pushed degree of the brake pedal) and transmits a signal corresponding thereto to the controller 100. When the brake pedal is pushed completely, the position of the brake pedal is 100%, and when the brake pedal is not pushed, the position of the brake pedal is 0%.

The vehicle speed sensor 93 detects a speed of the vehicle and transmits a signal corresponding thereto to the controller 100.

The intake pressure sensor 94 detects an intake pressure of air flowing into the engine 10 and transmits a signal corresponding thereto to the controller 100.

The controller 100 may diagnose a failure the CVVD apparatus 80 and the EGR valve 73 based on data detected by the data detector 90. The controller 100 may be implemented with at least one processor executed by a predetermined program, and the predetermined program may include a series of commands for performing each step included in a method of diagnosing an engine system according to an exemplary form of the present disclosure. Further, the controller 100 may control operations of the throttle valve 40, the EGR valve 73, and the CVVD apparatus 80 based on the data detected by the data detector 90.

Figure 3A:
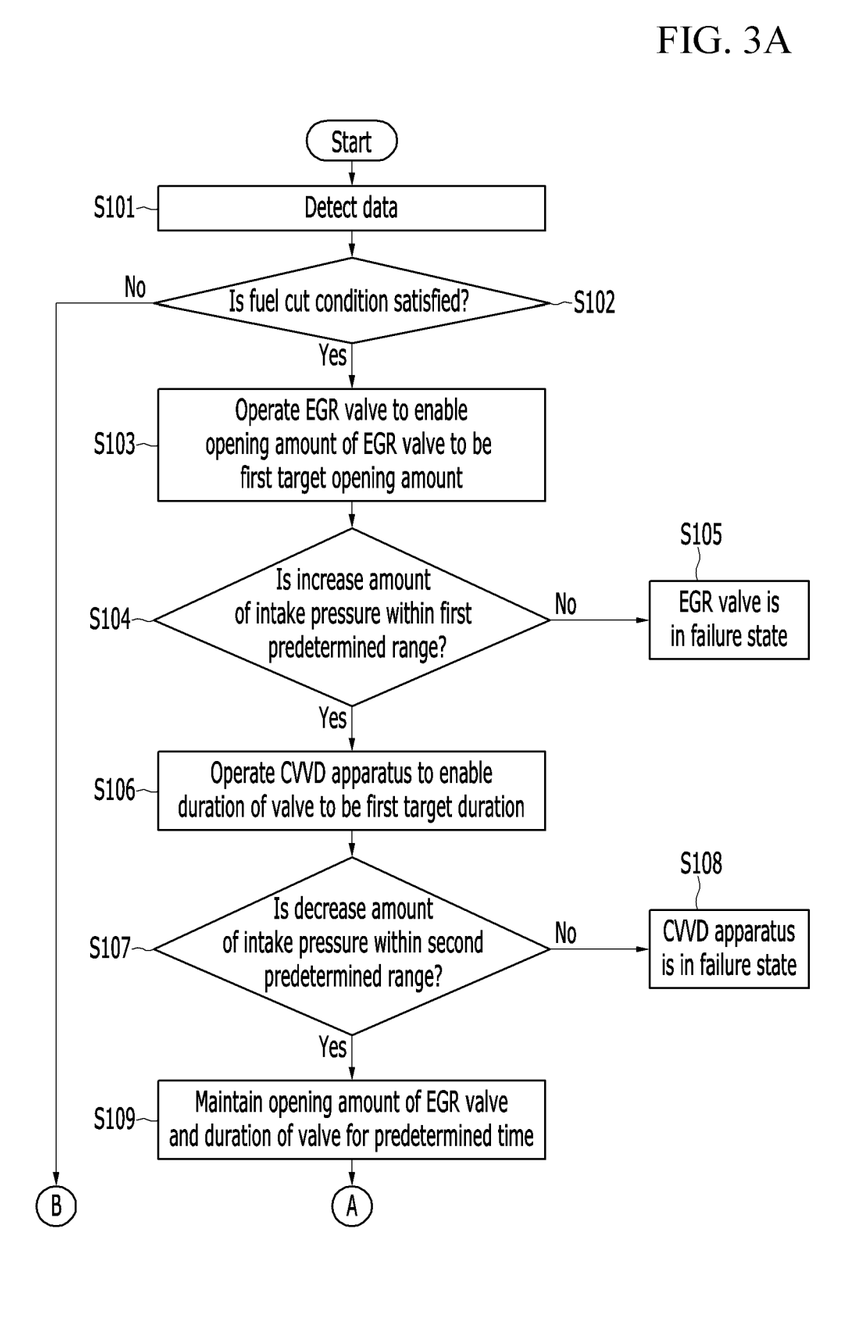
FIGS. 3A-3B are flowcharts illustrating a method of diagnosing an engine system in one exemplary form of the present disclosure.
Figure 3B:
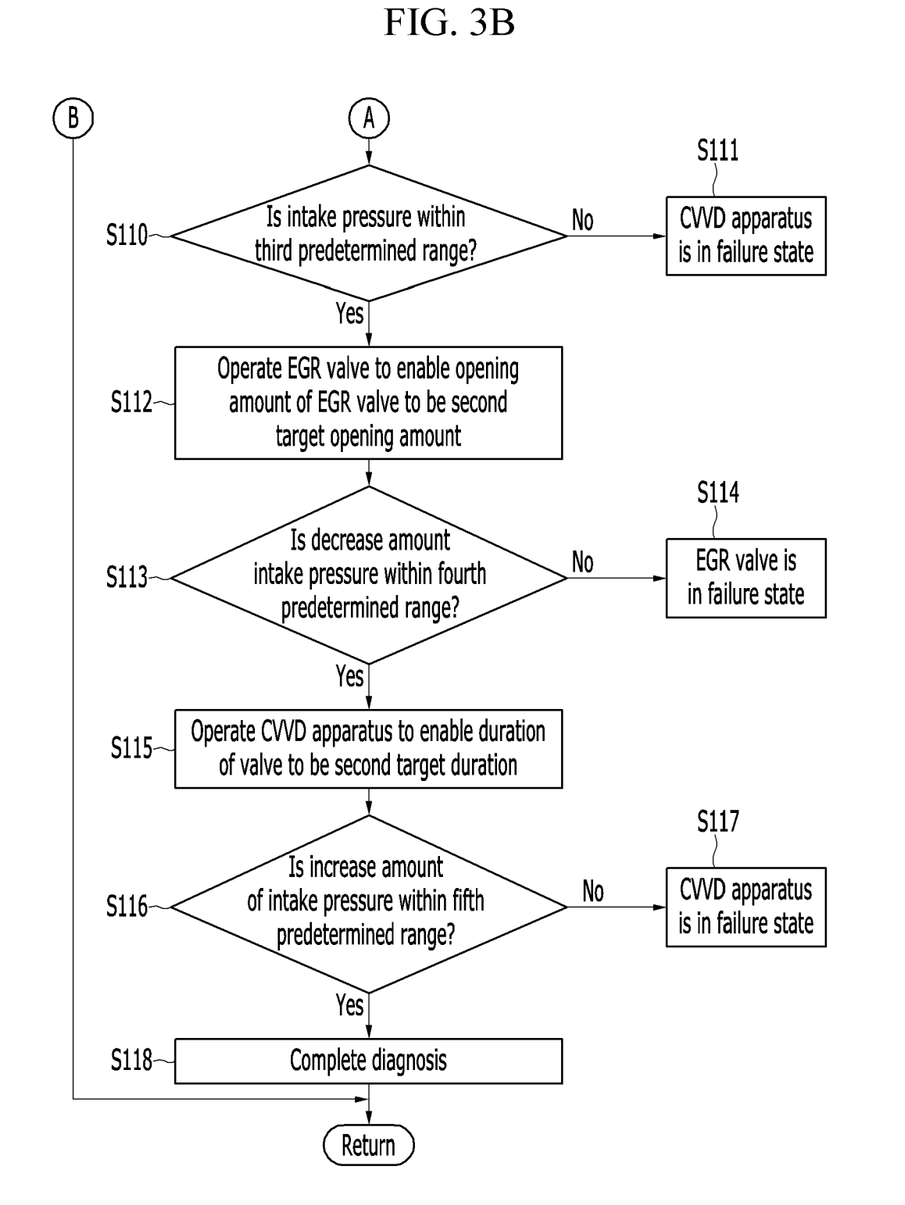

FIGS. 3A and 3B are flowcharts illustrating a method of diagnosing an engine system according to an exemplary form of the present disclosure.

As shown in FIGS. 3A and 3B, the controller 100 detects data for diagnosing the engine system at step S101. In other words, the accelerator pedal position sensor 91 detects the position of the accelerator pedal, the brake pedal position sensor 92 detects the position of the brake pedal, the vehicle speed sensor 93 detects the speed of the vehicle, and the intake pressure sensor 94 detects the intake pressure.

The controller 100 determines whether a fuel cut condition is satisfied based on the data at step S102. For example, the fuel cut condition may be satisfied when the vehicle coasts, and the controller 100 may determine whether the fuel cut condition is satisfied based on the position of the accelerator pedal, the position of the brake pedal, and the speed of the vehicle. For example, when the speed of the vehicle is equal to or greater than a predetermined speed and when the position of the accelerator pedal and the position of the brake pedal are 0%, the fuel cut condition may be satisfied. In the fuel cut state, the intake pressure may be changed according to an opening amount of the EGR valve 73 or a duration of the intake valve 14.

When the fuel cut condition is not satisfied at step S102, the process of diagnosing an engine system is terminated and reset for a new round.

When the fuel cut condition is satisfied at step S102, the controller 100 operates the EGR valve 73 to enable the opening amount of the EGR valve 73 to be a first target opening amount at step S103. As the opening amount of the EGR valve 73 increases, the intake pressure increases.

The controller 100 may determine whether an increase amount of the intake pressure by operation of the EGR valve 73 is within a first predetermined range at step S104. The first target opening amount may be set through an experiment such that an increase amount of an intake pressure has a predetermined value within the first predetermined range. In other words, an increase amount of an intake pressure according to an opening amount of the EGR valve 73 may be acquired through an experiment (e.g., an engine test), and the first target opening amount and the first predetermined range may vary based on the size and operation type of engines. The value and range may be obtained through various tests known to an ordinary skilled artisan in the art and stored in a memory or the controller 100.

When the increased amount of the intake pressure is not within the first predetermined range at step S104, the controller 100 may determine that the EGR valve 73 is in a failure state at step S105. In other words, the controller 100 may determine that the EGR valve 73 is stuck and the opening amount of the EGR valve 73 does not follow the first target opening amount.

When the increased amount of the intake pressure is within the first predetermined range at step S104, the controller 100 operates the CVVD apparatus 80 to enable a duration of the intake valve 14 to be a first target duration at step S106. As a duration of the intake valve 14 increases, the intake pressure decreases.

The controller 100 may determine that a decreased amount of the intake pressure by operation of the CVVD apparatus 80 is within a second predetermined range at step S107. The first target duration may be set through an experiment such that a decrease amount of an intake pressure has a predetermined value within the second predetermined range. In other words, a decrease amount of an intake pressure according to operation of the CVVD apparatus 80 may be acquired through an experiment, and the first target duration and the second predetermined range may be set to a value and a range that are determined as a desired value and a desired range by a person of ordinary skill in the art.

When the decreased amount of the intake pressure is not within the second predetermined range at step S107, the controller 100 may determine that the CVVD apparatus 80 is in a failure state at step S108. In other words, when the CVVD apparatus 80 is in the failure state, the controller 100 may determine that the duration of the intake valve 14 does not follow the first target duration.

When decreased amount of the intake pressure is within the second predetermined range at step S107, the controller 100 maintains the opening amount of the EGR valve 73 to the first target opening amount and the duration of the intake valve 14 to the first target duration for a predetermined time and monitors the intake pressure at a time point at which the predetermined time has elapsed at step S109.

The controller 100 may determine whether the intake pressure at the time point at which the predetermined time has elapsed is within a third predetermined range at step S110. An intake pressure when an opening amount of the EGR valve 73 is the first target opening amount and a duration of the intake valve 14 is the first target duration for the predetermined time may be acquired through an experiment, and the third predetermined range may be set to a range that is determined as a desired range by a person of ordinary skill in the art.

When the intake pressure is not within the third predetermined range at step S110, the controller 100 may determine that the CVVD apparatus 80 is in the failure state at step S111. In other words, when the CVVD apparatus 80 is in the failure state, the controller 100 may determine that the intake pressure is deviated from the third predetermined range.

When the intake pressure is within the third predetermined range at step S110, the controller 100 operates the EGR valve 73 to enable the opening amount of the EGR valve 73 to be a second target opening amount at step S112. The second target opening amount is less than the first target opening amount, and when an opening amount of the EGR valve 73 decreases, an intake pressure also decreases.

The controller 100 may determine whether a decreased amount of the intake pressure by operation of the EGR valve 73 is within a fourth predetermined range at step S113. The second target opening amount may be set through an experiment such that a decreased amount of an intake pressure has a predetermined value within the fourth predetermined range. In other words, a decreased amount of an intake pressure according to an opening amount of the EGR valve 73 may be acquired through an experiment, and the second target opening amount and the fourth predetermined range may be set to a value and a range that are determined as a desired value and a desired range by a person of ordinary skill in the art.

When the decreased amount of the intake pressure is not within the fourth predetermined range at step S113, the controller 100 may determine that the EGR valve 73 is in the failure state at step S114. In other words, the controller 100 may determine that the EGR valve 73 is stuck and the opening amount of the EGR valve 73 does not follow the second target opening amount.

When the decreased amount of the intake pressure is within the fourth predetermined range at step S113, the controller 100 operates the CVVD apparatus 80 to enable the duration of the intake valve 14 to be a second target duration at step S115. The second target duration is less than the first target duration, and when a duration of the intake valve decreases, an intake pressure increases.

The controller 100 may determine whether an increased amount of the intake pressure by operation of the CVVD apparatus 80 is within a fifth predetermined range at step S116. The second target duration may be set through an experiment such that an increased amount of an intake pressure has a predetermined value within the fifth predetermined range. In other words, an increased amount of an intake pressure according to operation of the CVVD apparatus 80 may be acquired through an experiment, and the second target duration and the fifth predetermined range may be set to a value and a range that are determined as a desired value and a desired range by a person of ordinary skill in the art.

When the increased amount of the intake pressure is not within the fifth predetermined range at step S116, the controller 100 may determine that the CVVD apparatus 80 is in the failure state at step S117. In other words, when the CVVD apparatus 80 is in the failure state, the controller 100 may determine that the duration of the intake valve 14 does not follow the second target duration.

When the increased amount of the intake pressure is within the fifth predetermined range at step S116, the controller 100 completes diagnosis of the engine system at step S118. In other words, the controller 100 may determine that the CVVD apparatus 80 and the EGR valve 73 are in a normal state.

In an exemplary form of the present disclosure, it is illustrated that the CVVD apparatus 80 adjusts an opening duration of the intake valve 14, but in even a case in which the CVVD apparatus 80 adjusts an opening duration of the exhaust valve 15, a failure of the CVVD apparatus 80 and the EGR valve 73 may be diagnosed with the method of diagnosing an engine system.

As described above, according to an exemplary form of the present disclosure, failures of the CVVD apparatus 80 and the EGR valve 73 may be diagnosed.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

10: Engine
20: Turbocharger
30: Intake line
40: Throttle valve
50: First exhaust line
60: Second exhaust line
70: Low pressure EGR apparatus
80: Continuous variable valve duration apparatus
90: Data detector
100: Controller

What is claimed is:

1. A method of diagnosing an engine system including a continuous variable valve duration (CVVD) apparatus and an exhaust gas recirculation (EGR) apparatus, the method comprising:
   detecting data, by a data detector, for diagnosing the engine system;
   determining, by a controller, whether a fuel cut condition is satisfied based on the detected data;
   operating, by the controller, an EGR valve such that an opening amount of the EGR valve becomes a first target opening amount when the fuel cut condition is satisfied;
   determining, by the controller, whether an increased amount of an intake pressure by operation of the EGR valve is within a first predetermined range;
   operating, by the controller, the CVVD apparatus such that an opening duration of an intake valve becomes a first target duration when the increased amount of the intake pressure by operation of the EGR valve is within the first predetermined range;
   determining, by the controller, whether a decreased amount of the intake pressure by operation of the CVVD apparatus is within a second predetermined range; and
   determining, by the controller, that the CVVD apparatus is in a failure state when the decreased amount of the intake pressure by operation of the CVVD apparatus is out of the second predetermined range.

2. The method of claim 1, further comprising: determining, by the controller, that the EGR valve is in a failure state when the increased amount of the intake pressure by operation of the EGR valve is out of the first predetermined range.

3. The method of claim 1, further comprising:
   maintaining, by the controller, the opening amount of the EGR valve at the first target opening amount and the opening duration of the intake valve at the first target duration for a predetermined time when the decreased amount of the intake pressure by operation of the CVVD apparatus is within the second predetermined range;
   monitoring, by the controller, the intake pressure at a time point at which the predetermined time has elapsed; and
   determining, by the controller, whether the intake pressure at the time point at which the predetermined time has elapsed is within a third predetermined range.

4. The method of claim 3, further comprising: determining, by the controller, that the CVVD apparatus is in the failure state when the intake pressure at the time point at which the predetermined time has elapsed is out of the third predetermined range.

5. The method of claim 3, further comprising: operating, by the controller, the EGR valve such that the opening amount of the EGR valve becomes a second target opening amount when the intake pressure at the time point at which the predetermined time elapsed is within the third predetermined range,
   wherein the second target opening amount is less than the first target opening amount.

6. The method of claim 5, further comprising: determining, by the controller, whether the decreased amount of the intake pressure by operation of the EGR valve is within a fourth predetermined range; and
   Determining, by the controller, that the EGR valve is in a failure state when the decreased amount of the intake pressure by operation of the EGR valve is out of the fourth predetermined range.

7. The method of claim 6, further comprising: operating, by the controller, the CVVD apparatus such that the opening duration of the intake valve becomes a second target duration when the decreased amount of the intake pressure by operation of the EGR valve is within the fourth predetermined range,
   wherein the second target duration is less than the first target duration.

8. The method of claim 7, further comprising: determining, by the controller, whether the increased amount of the intake pressure by operation of the CVVD apparatus is within a fifth predetermined range; and
   determining, by the controller, that the CVVD apparatus is in the failure state when the increased amount of the intake pressure by operation of the CVVD apparatus is out of the fifth predetermined range.

9. The method of claim 8, further comprising: determining, by the controller, that the CVVD apparatus and the EGR valve are in a normal state when the increased amount of the intake pressure by operation of the CVVD apparatus is within the fifth predetermined range.

10. An apparatus for diagnosing an engine system including a continuous variable valve duration (CVVD) apparatus and an exhaust gas recirculation (EGR) apparatus, the apparatus comprising:
    an accelerator pedal position sensor configured to detect a position of an accelerator pedal;
    a brake pedal position sensor configured to detect a position of a brake pedal;
    a vehicle speed sensor configured to detect a speed of a vehicle;
    an intake pressure sensor configured to detect an intake pressure; and
    a controller configured to control an EGR valve and the CVVD apparatus and to determine whether a fuel cut condition is satisfied and whether the CVVD apparatus and the EGR valve is in a failure state when the fuel cut condition is satisfied,
    wherein when the fuel cut condition is satisfied, an opening amount of the EGR valve is controlled to be a first target opening amount,
    wherein when an increased amount of the intake pressure by operation of the EGR valve is within a first predetermined range, an opening duration of an intake valve is controlled by the CVVD apparatus to be a first target duration, and
    wherein the controller is configured to determine that the CVVD apparatus is in the failure state when a decreased amount of the intake pressure by operation of the CVVD apparatus is beyond a second predetermined range.

11. The apparatus of claim 10, wherein the controller determines that the EGR valve is in the failure state when the increased amount of the intake pressure by operation of the EGR valve is beyond the first predetermined range.

12. The apparatus of claim 10, wherein the controller is configured to maintain the opening amount of the EGR valve at the first target opening amount and the opening duration of the intake valve at the first target duration for a predetermined time when the decreased amount of the intake pressure by operation of the CVVD apparatus is within the second predetermined range,
    wherein the controller is configured to monitor the intake pressure at a time point at which the predetermined time has elapsed, and configured to determine whether the intake pressure at the time point at which the predetermined time has elapsed is within a third predetermined range.

13. The apparatus of claim 12, wherein the controller determines that the CVVD apparatus is in the failure state when the intake pressure at the time point at which the predetermined time is beyond the third predetermined range.

14. The apparatus of claim 13, wherein when the intake pressure at the time point at which the predetermined time has elapsed is within the third predetermined range, the opening amount of the EGR valve is controlled by the EGR valve to be, a second target opening amount and
   wherein the second target opening amount is less than the first target opening amount.

15. The apparatus of claim 14, wherein the controller determines whether the decreased amount of the intake pressure by operation of the EGR valve is within a fourth predetermined range and determines that the EGR valve is in the failure state when the decreased amount of the intake pressure by operation of the EGR valve is beyond the fourth predetermined range.

16. The apparatus of claim 15, wherein the controller operates the CVVD apparatus such that the opening duration of the intake valve becomes a second target duration when the decreased amount of the intake pressure by operation of the EGR valve is within the fourth predetermined range, and
   wherein the second target duration is less than the first target duration.

17. The apparatus of claim 16, wherein the controller determines whether the increased amount of the intake pressure by operation of the CVVD apparatus is within a fifth predetermined range and determines that the CVVD apparatus is in the failure state when the increased amount of the intake pressure by operation of the CVVD apparatus is beyond the fifth predetermined range.

18. The apparatus of claim 17, wherein the controller determines that the CVVD apparatus and the EGR valve are in a normal state when the increased amount of the intake pressure by operation of the CVVD apparatus is within the fifth predetermined range.

19. A method of diagnosing an engine system including a continuous variable valve duration (CVVD) apparatus and an exhaust gas recirculation (EGR) apparatus, the method comprising:
   detecting, by a data detector, data for diagnosing the engine system;
   determining, by a controller, whether a fuel cut condition is satisfied based on the detected data;
   operating, by the controller, an EGR valve such that an opening amount of the EGR valve becomes a first target opening amount when the fuel cut condition is satisfied;
   determining, by the controller, whether an increased amount of an intake pressure by operation of the EGR valve is within a first predetermined range;
   operating, by the controller, the CVVD apparatus such that an opening duration of an exhaust valve becomes a first target duration when the increased amount of the intake pressure by operation of the EGR valve is within the first predetermined range;
   determining, by the controller, whether a decreased amount of the intake pressure by operation of the CVVD apparatus is within a second predetermined range; and
   determining, by the controller, that the CVVD apparatus is in a failure state when the decreased amount of the intake pressure by operation of the CVVD apparatus is out of the second predetermined range.

20. An apparatus for diagnosing an engine system including a continuous variable valve duration (CVVD) apparatus and a low pressure exhaust gas recirculation (EGR) apparatus, the apparatus comprising,
   an accelerator pedal position sensor configured to detect a position of an accelerator pedal;
   a brake pedal position sensor configured to detect a position of a brake pedal;
   a vehicle speed sensor configured to detect a speed of a vehicle;
   an intake pressure sensor configured to detect an intake pressure; and
   a controller configured to determine whether a fuel cut condition is satisfied based on signals from at least one of the accelerator position sensor, brake pedal position sensor, vehicle speed sensor or intake pressure sensor, and configured to determine whether the CVVD apparatus and an EGR valve is in a failure state when the fuel cut condition is satisfied,
   wherein the controller is configured to control, via the EGR valve, an opening amount of the EGR valve to be a first target opening amount when the fuel cut condition is satisfied,
   wherein the controller is configured to control, via the CVVD apparatus, an opening duration of an exhaust valve to be a first target duration when an increased amount of the intake pressure by operation of the EGR valve is within a first predetermined range, and
   wherein the controller is configured to determine that the CVVD apparatus is in the failure state when a decreased amount of the intake pressure by operation of the CVVD apparatus is out of a second predetermined range.

* * * * *